United States Patent [19]

Kratz

[11] Patent Number: 5,169,275
[45] Date of Patent: Dec. 8, 1992

[54] AUTOMATIC SLAB TURNER

[75] Inventor: Michel Kratz, Fairfield, Ohio

[73] Assignee: International Mill Service, Inc., Philadelphia, Pa.

[21] Appl. No.: 672,969

[22] Filed: Mar. 21, 1991

[51] Int. Cl.⁵ .......................................... B65G 67/02
[52] U.S. Cl. .................................. 414/392; 414/590; 414/779
[58] Field of Search .............. 414/742, 743, 590, 754, 414/759, 758, 773, 774, 779, 680, 391, 392, 399; 266/51, 57; 198/403, 413

[56] References Cited

U.S. PATENT DOCUMENTS

| | | | |
|---|---|---|---|
| 1,733,988 | 10/1929 | Barnard | 414/743 |
| 2,521,303 | 9/1950 | Reed | 526/320 |
| 2,524,085 | 10/1950 | Saul, Jr. | 414/590 |
| 2,567,819 | 9/1951 | Matteson | 414/754 |
| 2,597,246 | 5/1952 | Kelly | 209/255 |
| 2,828,870 | 4/1958 | Corley | 414/754 |
| 2,915,199 | 12/1959 | Evans | 414/759 |
| 2,928,558 | 3/1960 | Bamford | 414/680 |
| 3,236,396 | 2/1966 | Goodberlet | 414/754 |
| 3,286,854 | 11/1966 | Crawford | 414/742 |
| 3,400,835 | 9/1968 | Rhoads | 414/774 |
| 3,430,781 | 3/1969 | Nectoux | 414/779 |
| 3,487,953 | 1/1970 | Wolf | 414/759 |
| 3,695,459 | 10/1972 | Raes | 414/773 |
| 3,759,366 | 9/1973 | Adank | 414/779 X |
| 3,829,072 | 8/1974 | Fieser | 266/51 |
| 3,862,749 | 1/1975 | Fieser | 148/9.5 |
| 3,870,570 | 3/1975 | Fieser | 148/9.5 |
| 4,037,731 | 7/1977 | Reis et al. | 414/743 X |
| 4,124,126 | 11/1978 | Abraham | 414/758 |
| 4,131,206 | 12/1978 | Kawada | 414/352 |
| 4,599,035 | 7/1986 | Goodlad et al. | 414/742 X |

FOREIGN PATENT DOCUMENTS 102755 8/1979 Japan .................................. 414/759

Primary Examiner—David A. Bucci
Attorney, Agent, or Firm—Dann, Dorfman, Herrell and Skillman

[57] ABSTRACT

Handling apparatus for metal slabs comprising a slab turner and a transfer cart. The slab turner receives the metal slab and transfers it to a bunk on the cart which tilts the slab so that one surface of the slab is upward. The cart moves the slab through a scarfing station which scarfs the upwardly-directed surface of the slab. The cart moves back to the slab turner and the slab turner cooperates with the transfer cart to receive the slab from the transfer cart and return the slab to the transfer cart bunk with the opposite surface upward, whereupon the transfer cart again moves the slab into the scarfing station for scarfing the opposite surface. In the scarfing station, the transfer cart supports the slab in a tilted position by toe portions underlying one edge of the slab, and enables rotation of the slab to a generally horizontal position which exposes the edge which supports the slab in the tilted position, so that the edge may be scarfed while the slab is generally horizontal.

16 Claims, 10 Drawing Sheets

AUTOMATIC SLAB TURNER

FIELD OF THE INVENTION

This invention relates to a system and method for rotating and handling heavy objects. In particular, the present invention relates to an automated system and method for rotating and handling a metal slab requiring surface conditioning such as scarfing.

BACKGROUND OF THE INVENTION

Conditioning the surface of metal in a semi-finished state before additional processing is a necessary and common procedure to preserve the integrity of finished metal products. If not cured, surface defects present in the metal in its semi-finished state can cause severe defects in the processed metal, as well as fouling the processing equipment. Several different surface conditioning techniques are used to cure surface defects present in steel and other metals after processing. Examples of these techniques include grinding, hand chipping, and scarfing.

The most common method of removing surface defects from steel slabs, billets, and blooms is scarfing. Scarfing steel slabs is a process of applying oxygen and gas, usually by a torch, to the surface of the steel slab to oxidize and melt the surface steel. The oxidized material and molten steel, including and adjacent the surface defect, is then blown away from the slab.

Many different methods of manual and machine scarfing are provided in the prior art, each with varying degrees of efficiency. One common requirement of each method is easy access to each surface of the metal to be scarfed. Thus, a metal slab with one surface resting on a platform or rail cart must eventually be turned over or rotated during the scarfing process to expose such surface to the scarfing equipment.

Rotating and handling metal slabs weighing up to 40 tons presents serious practical and safety concerns. One method and system for conditioning metal slabs disclosed in the prior art provides two independently rotatable leaves for rotating a slab in a stationary carrier in a scarfing station. This method and system, however, only provide scarfing access to the bottom and top surfaces of the slab and neglect the outside edges of the slab. This system also fails to provide, inter alia, a movable cart thereby requiring the scarfing equipment to move relative to the rotatable leaves. While other machines are provided in the prior art for handling various heavy objects, none are adapted for use with steel slabs or provide the increased efficiency and safety of the present invention.

SUMMARY OF THE INVENTION

The present invention provides a system and method for rotating and handling a metal slab requiring surface conditioning such as scarfing. The system comprises a carrier in the form of a transfer cart, and a slab turner, each designed to cooperate with the other, to rotate and linearly displace a slab by tilting and passing the slab in a series of coordinated steps between the carrier and the slab turner. The invention provides one step for transferring the slab while horizontal and another step for transferring the slab while non-horizontal.

The slab turner comprises a turner bunk pivotally mounted to a multiple-linkage support structure and designed to receive a flat slab. The support structure is integrally linked with several fluid actuated rams for rotating the turner bunk about several independent axes of rotation, as well as linearly displacing the turner bunk perpendicular to the several axes of rotation towards and away from the transfer cart.

The transfer cart comprises a cart bunk pivotally mounted to a movable rail cart and designed to receive a flat slab from the slab turner. The cart bunk is linked to a transfer cart support structure by fluid actuated rams which rotate the cart bunk about an axis of rotation parallel to the axes of rotation of the slab turner.

The rotational paths of the slab turner and transfer cart overlap allowing the turner and cart to exchange the slab. The rotational paths do not, however, interfere with each other, allowing independent movement and rotation of the respective bunks of the transfer cart and the slab turner.

In one of the prior art arrangements, an overhead lifting device is used twice during the scarfing process. The lifting device is first used to load and unload a slab directly on a transfer cart for movement to a scarfing area. The lifting device is also used in between loading and unloading to rotate the slab.

In the present invention, the slab is delivered initially to a reinforced support structure thereby reducing impact loading and wear on the transfer cart or slab turner. The slab is rotated by the slab turner and transfer cart and not an by overhead lifting device. Demand, maintenance, and repair are therefore reduced on the overhead lifting device as well. Personnel involvement in the overall scarfing process is also reduced as the process becomes more automated according to the present invention. Safety is improved since handlings by the overhead lifting device are cut in half. Safety is also improved since the slab turner positively lifts the slab from underneath as opposed to lifting the slab from its top surface by a series of magnets.

The system embodied in the present invention may have numerous applications in areas other than handling of heavy metal slabs for scarfing. The system and method has application where handling of large, heavy products is critical, and where roller tables or transfer cars are involved.

BRIEF DESCRIPTION OF THE DRAWINGS

A preferred structure and example of the invention are more fully set forth hereinafter with reference to the accompanying drawings, wherein.

DESCRIPTION OF THE PREFERRED EMBODIMENTS

Referring now in greater detail to the drawings, the invention provides a system for rotating and handling a heavy metal slab requiring surface conditioning. The system is particularly adapted for use with a metal slab requiring scarfing on each of the slab's outside surfaces, including the outside edges.

The system comprises two major components, a slab turner and a carrier, which are designed to closely interact to perform the required rotating procedure. The carrier is preferably in the form of a transfer cart which carries the slab into a scarfing station. The system rotates the slab, exposing each outside surface and edge to the scarfing equipment. The slab is turned through a series of coordinated steps in which the slab is tilted, rotated, and passed back and forth between the slab turner and transfer cart twice in the turning cycle.

Figure 1:
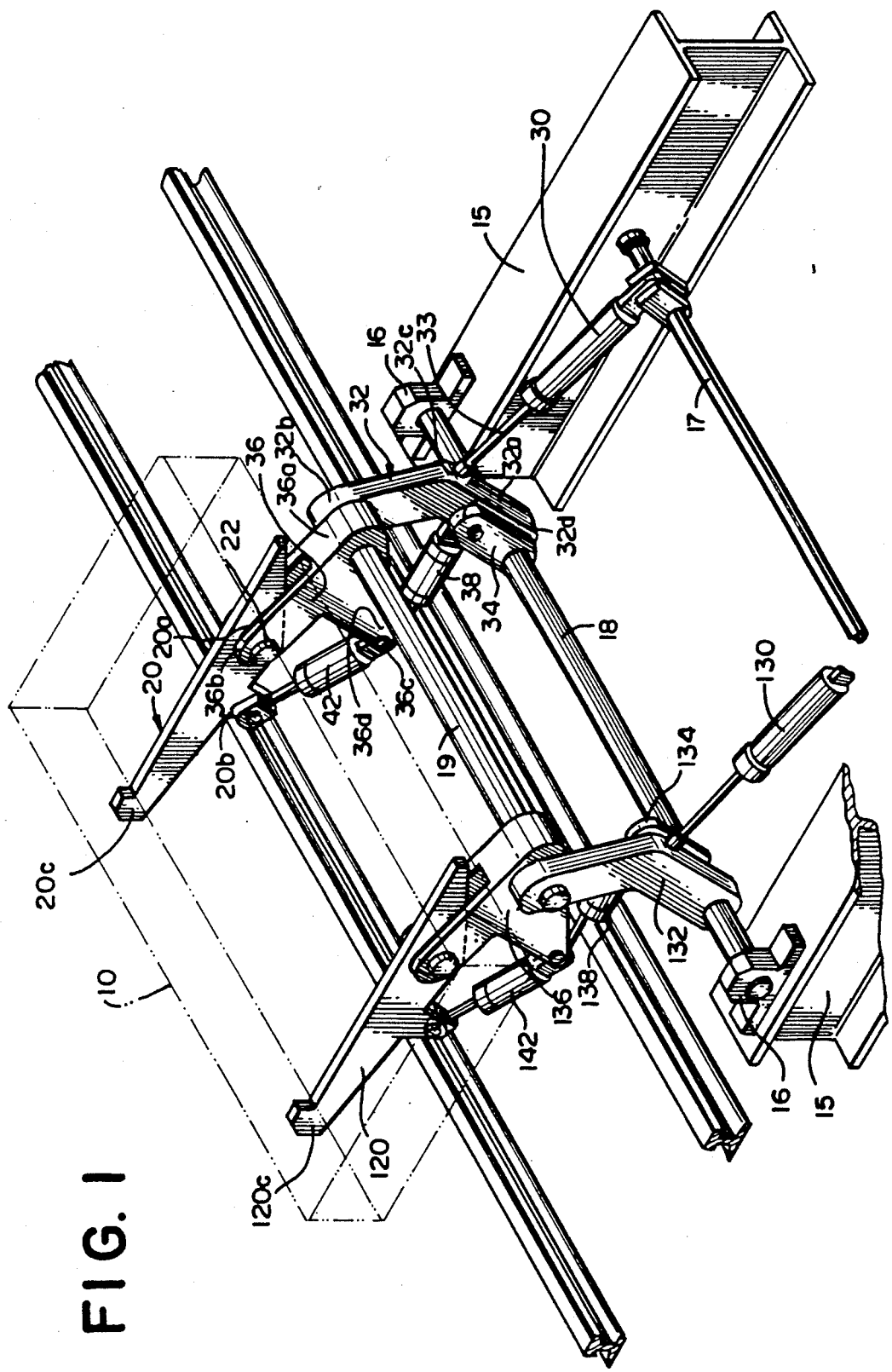
FIG. 1 is a perspective view of a slab turner handling a slab (shown in phantom) according to the present invention.

The slab turner comprises a turner bunk 20 pivotally mounted to a support structure capable of rotating and linearly displacing the turner bunk into and out of close proximity with the transfer cart. As seen in FIG. 1, the support structure is pivotally fixed to a support base 15. The support structure comprises several support members pivotally mounted to each other at their respective ends. Each support member is also linked to and controlled by an independent fluid actuated ram. The fluid actuated rams are operable between extended and retracted positions for rotating the support members about independent axes of rotation relative to each other.

The support structure comprises a set of identical pivotal linkages. The linkages are spaced apart as much as four meters or more, depending on the length of the transfer cart and the length of the slab to be handled. The weight of the slab is equally balanced on each linkage. Several support members of the oppositely disposed linkages are connected by cross pieces, such as axles and sleeves or torque tubes, to insure synchronous movement of the corresponding support members in each linkage of the structure.

Describing the elements of a linkage from the base 15 up to the bunk 20, a first support member 32 is mounted at its proximal end 32a to a first axle piece 18 which rotates in a hinge housing or journal 16 mounted on the support base 15 as seen in FIG. 1. Spherical brass bushings or roller bearings are provided for smooth rotation of the first piece 18 and other connecting axle pieces, 17, 19, and 22. The first support member 32 has an aperture through its proximal end the same size and shape as the first piece 18 to which it is fixed. The first support member 32 does not rotate with respect to the first piece 18. Rather, the cross piece 18 rotates in the hinge housing 16.

The dimensions of the first support member 32 and the other support members on the turner (described hereinafter), are interdependent, as well as dependent on the dimensions of the transfer cart, metal slab, and scarfing facilities. The support members may be either straight or angled, as seen in FIG. 1, to obtain the desired path of motion. Several alternate combinations of support member dimensions may create the desired path of motion of the slab turner.

A primary fluid actuated ram 30 is fixed at its cylinder end to a connecting piece 17 which is pivotally mounted to on the support base 15 distantly from the hinge 16. The primary fluid actuated ram 30 does not rotate with respect to the connecting piece 17. Rather, the connecting piece 17 rotates on the support base. The ram end of the primary fluid actuated ram is pivotally fixed to the first support member 32 at a medial position 32c on the first support member 32. The primary fluid actuated ram 30 extends and retracts causing the first support member 32 to rotate about a first axis of rotation, i.e., the axis of the connecting piece 18, relative to the support base.

The first support member 32 and the primary fluid actuated ram are linked to a corresponding parallel first support member 132 and primary fluid actuated ram 130 on the second linkage by connecting pieces 18 and 17, respectively. Rotation of either first support member, 32 or 132, or of either primary fluid actuated ram, 30 or 132, will cause the other support member or fluid actuated ram to rotate the same distance, respectively.

A second support member 36 is pivotally mounted at its proximal end 36a to the second connecting piece 19 which rotates in an aperture located in the distal end 32b of the first support member. The second support member has an aperture through its proximal end 32a the same size and shape as the second connecting piece 19 to which it is fixed. The second support member 36 does not rotate with respect to the second connecting piece 19. Rather, the connecting piece 19 rotates with respect to the first support member 32.

The second support member 36 is linked to a parallel corresponding second support member 136 on the second linkage by the connecting piece 19. The parallel second support member 136 is a)so fixed to the connecting piece 19 such that rotation of either support member, 36 or 136, will cause the other support member to rotate the same distance.

A secondary fluid actuated ram 38 is preferably pivotally mounted at its cylinder end at a medial position 32d on the first support member. As seen in FIG. 1, an extensions of the first support member 34 is fixed to the first connecting piece 18. The cylinder end of the secondary fluid actuated ram 38 is pivotally mounted to the extension 34. The ram end of the secondary fluid actuated ram 38 is pivotally fixed to a medial position 36c on the second support member 36. The secondary fluid actuated ram extends and retracts causing the second support member to rotate about a second axis of rotation relative to the first support member 32. The second axis of rotation, connecting piece 19, is parallel to the first axis of rotation, i.e., the axis of the connecting piece 18.

A turner bunk 20 is pivotally mounted at a medial position 20a to the distal end 36b of the second support member 38. The turner bunk 20 and second support member 36 each have an aperture to receive a common pivot pin 22 linking the bunk and support member.

A tertiary fluid actuated ram 42 is pivotally mounted at its cylinder end at a medial position 36d on the second support member 36. The shaft end of the tertiary fluid actuated ram is pivotally fixed to a medial position 20b on the turner bunk located distantly from the pivot pin 22. The tertiary fluid actuated ram 42 extends and retracts causing the turner bunk to rotate about a turner bunk axis of rotation, pivot pin 22, relative to the second support member 36. The turner bunk axis of rotation, i.e., the axis of the pivot pin 22, is parallel to the first and second axes of rotation.

A second corresponding parallel turner bunk 120 is pivotally mounted on a parallel second support member 136. The two turner bunks define a flat turner bunk plane on which a metal slab 10 (shown in phantom) will be received in a substantially horizontal position relative to the structure base 15. A toe cap mechanism 20c perpendicular to the turner bunk plane is mounted to each turner bunk to prevent the slab 10 from sliding off the turner bunk plane as the turner bunk rotates the slab towards a substantially vertical or other non-horizontal position.

Figure 3:
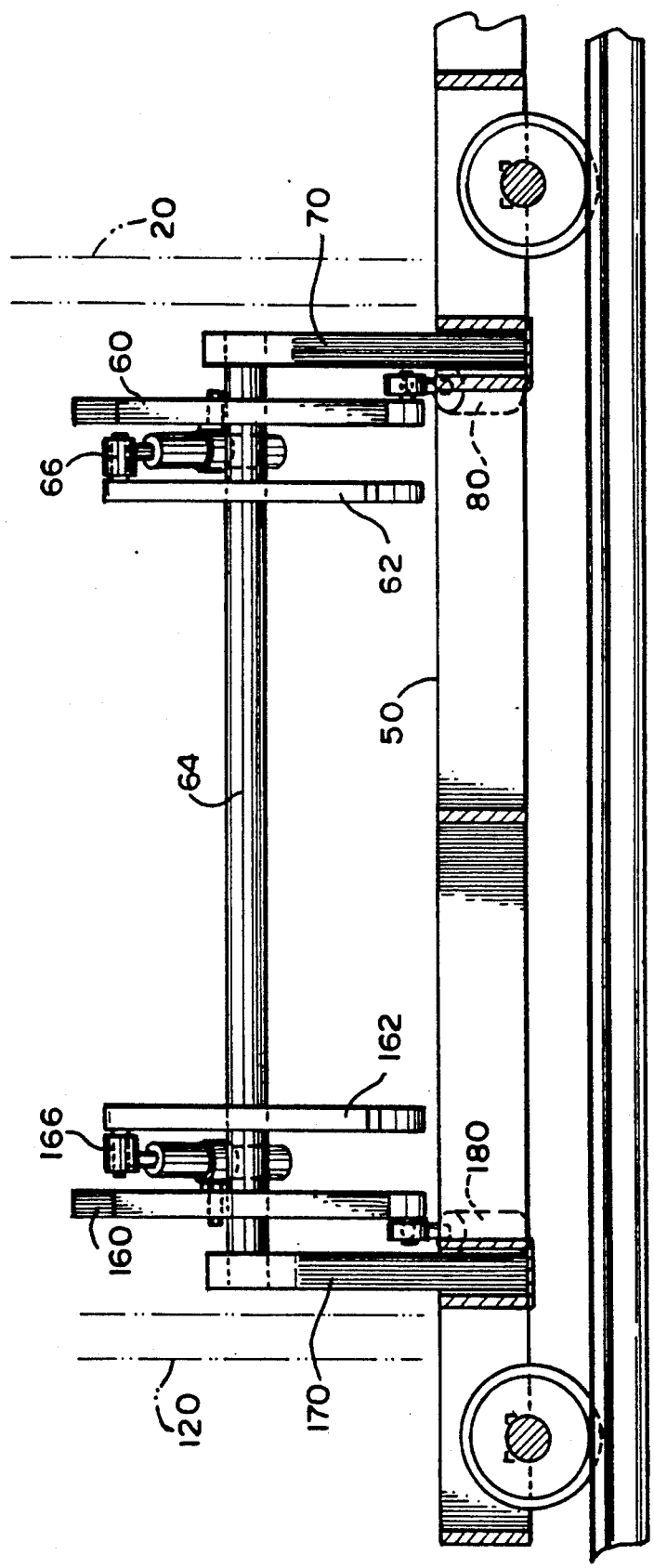
FIG. 3 is a front elevational view of a transfer cart with the overlapping path of the slab turner shown in relation to the cart.
Figure 16:
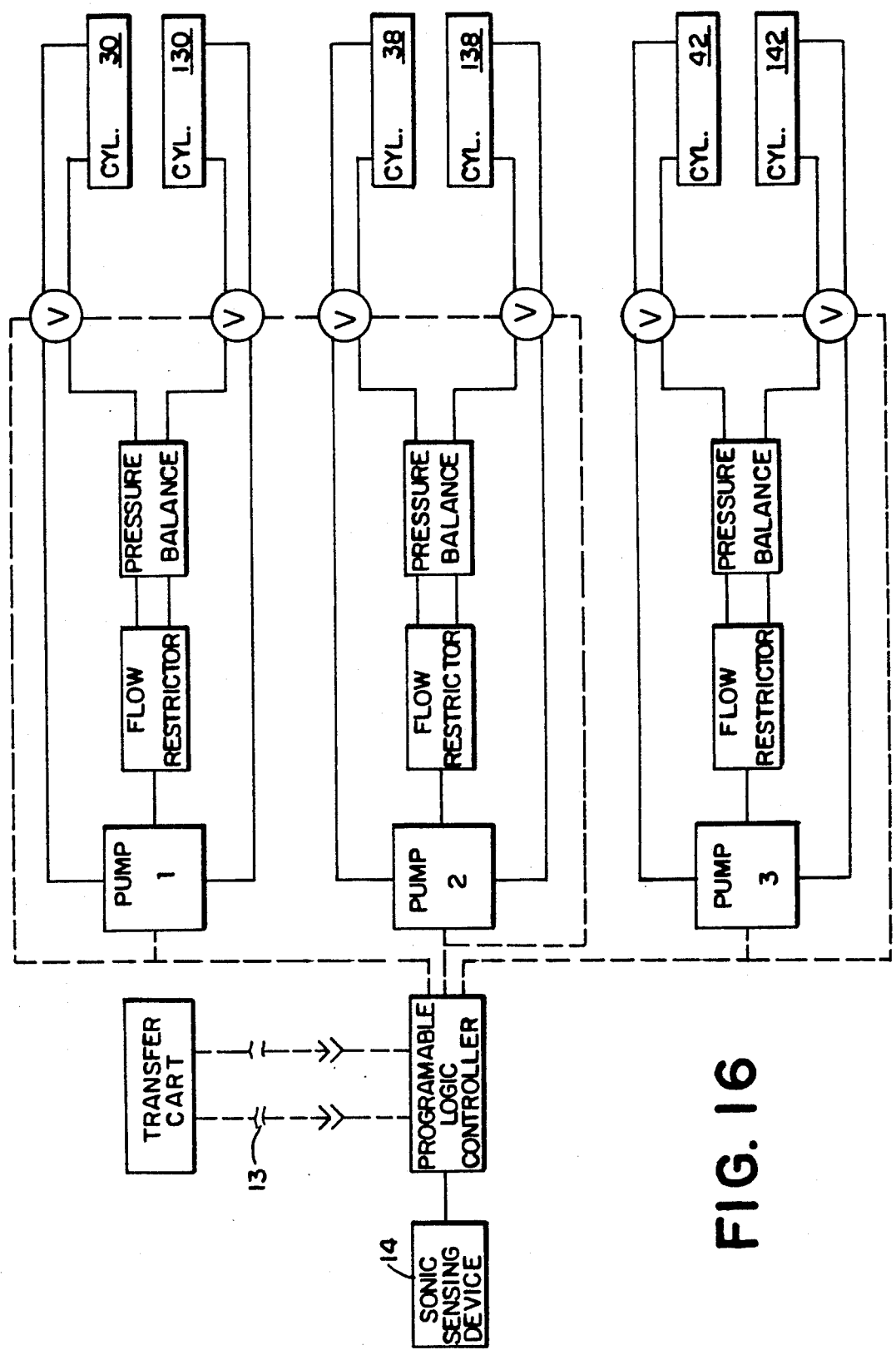
FIG. 16 is a schematic diagram of the sensing device and control components for the fluid actuated rams of the slab turner and transfer cart.

Cooperating with each other, the fluid actuated rams act on the support members via a programmable logic controller, shown schematically in FIG. 16, to rotate and move the turner bunk linearly towards and away from the transfer cart. The path of the turner bunk can be changed by reprogramming the programmable logic controller to accommodate metal slabs, transfer carts, and scarfing facilities of varying dimensions. For example the turner can handle slabs with widths varying from two feet to seven feet. As seen in FIG. 3, the path of the slab turner is shown in phantom relative to the transfer cart.

Each linkage preferably has a separate pump providing hydraulic pressure to the fluid actuated rams. To insure synchronous movement of each paired support members on the linkages, each pump contains an adjustable flow restricter and a pressure balance. The flow restricter insures equal flow of hydraulic fluid to corresponding cylinders of each linkage. The pressure balance insures equal pressure in each cylinder in the event a slab is loaded off center and weighs more heavily on one linkage than the other.

Figure 2:
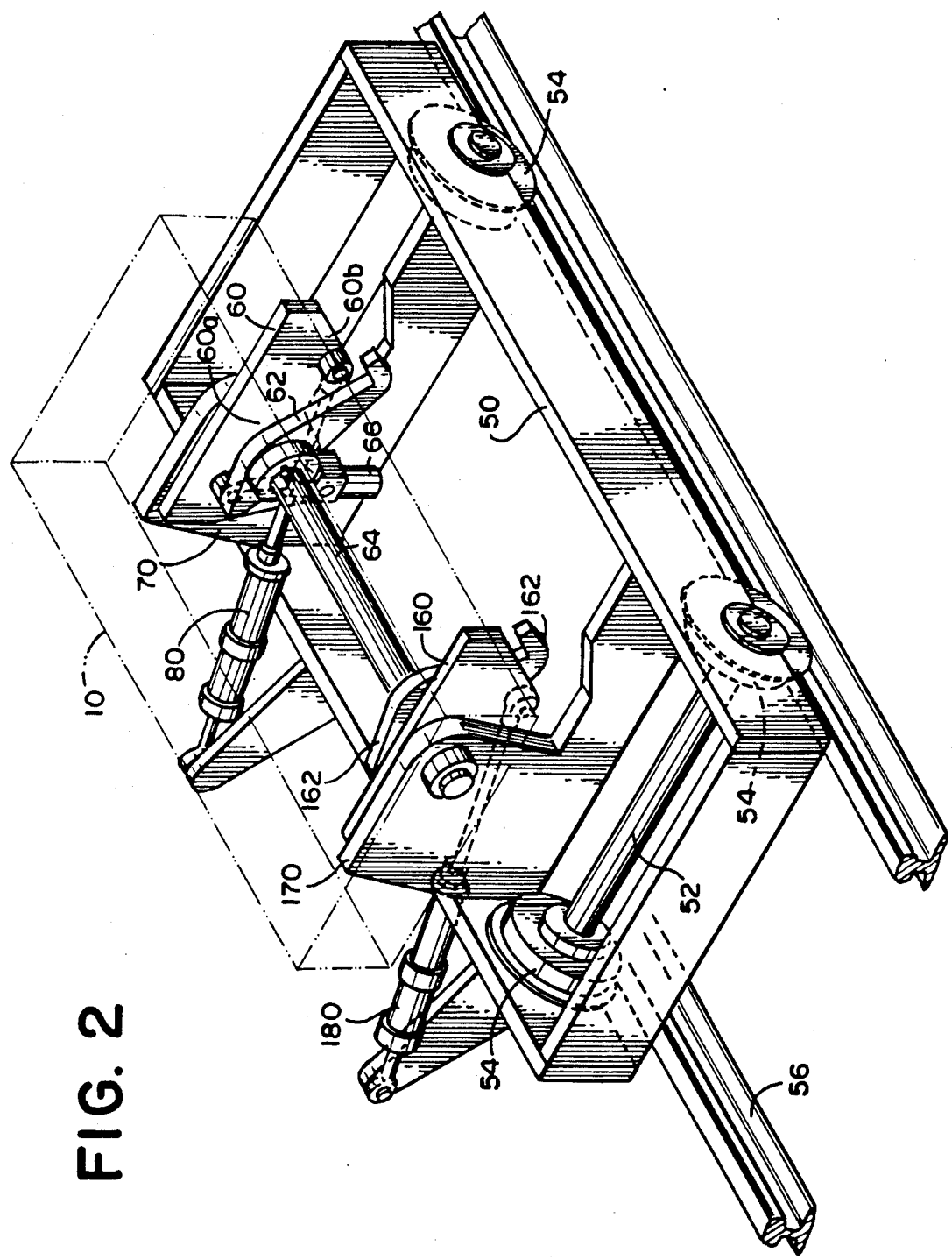
FIG. 2 is a perspective view of a transfer cart handling a slab (shown in phantom) according to the present invention.

Referring to FIG. 2, the transfer cart comprises a movable cart base 50 supported by two axles 52 and rail wheels 54 for movement along rail tracks 56. A cart bunk 60 is fixed to a connecting axle piece 64 pivotally mounted to a cart bunk support structure 70 fixed to the transfer cart 50. The support structure comprises two identical rigid support members 70 and 170 spaced along the length of the cart.

The dimensions of the rigid support members 70 and 170 are dependent on the dimensions of the slab turner, metal slab, and scarfing facilities. As seen in FIG. 3, the distance between the outside surfaces of the cart support members, however, must be less than the distance between the inside surfaces of the turner support structures and turner bunks so that the bunks of the transfer cart and slab turner can overlap or interdigitate without interference. The rigid support members are spaced approximately four meters or less from each other.

The cart bunk 60 is fixed at a medial position 60a to a connecting piece 64 pivotally mounted to the support structure 60. The cart bunk does not rotate relative to the connecting piece 64. Rather, the connecting piece 64 rotates in and relative to the support structure 70. The cart bunk axis of rotation, i.e., the axis of the connecting piece 64, is parallel to the first, second, and turner bunk axes of rotation.

The second cart bunk 160 is linked to the first cart bunk 60 by the connecting piece 64, which is supported by and also rotates about the second support structure 160. The second cart bunk is also fixed to the connecting piece 64 such that rotation of either cart bunk, 60 or 160, will cause the other bunk to rotate the same distance.

The two turner bunks 60 and 160 define a cart bunk flat plane on which a metal slab 10 (shown in phantom) will be received from the slab turner in a substantially horizontal position relative to the cart base 50. A toe cap mechanism 62 and 162 is rotatably mounted to each cart bunk to prevent the slab 10 from sliding off the cart bunk plane as the cart bunk rotates the slab towards a substantially vertical or other non-horizontal position. The toe cap mechanism and the cart bunk rotate independently but are connected via a toggling mechanism 66 and 166 between a projected position perpendicular to the cart bunk plane, preventing a slab from sliding in the plane, and a retracted position below and out of the cart bunk plane, exposing the outside edge of the slab for scarfing as seen for example in FIGS. 8–10. The toggling mechanism is preferably a fluid-actuated ram pivotally connected at its cylinder end on the cart bunk 60 and 160 and at its ram end on the toe cap mechanism 62 and 162.

A fluid actuated ram 80 is pivotally mounted at its cylinder end to the cart base 50 near the bottom of the cart bunk support structure 70. The ram end of the fluid actuated ram is pivotally fixed to a medial position 60b on the turner bunk distantly from the cart bunk axis of rotation 64. The fluid actuated ram 80 expands and retracts, rotating the cart bunk about the cart bunk axis of rotation 64 relative to the cart base 50. Rotating from a substantially horizontal position relative to the cart base 50, the turner bunk has at least 90 degrees of rotation such that a slab lying in the cart bunk plane is rotated from a horizontal position lying on its face to a vertical position lying on its edge, and beyond to another non-horizontal position.

The fluid actuated rams act on the cart bunk and toe cap mechanism via the same programmable logic controller controlling movement of the fluid actuated rams on the slab turner. The transfer cart has a separate pump providing hydraulic pressure to the fluid actuated rams on the cart. To insure synchronous movement of each fluid actuated ram 80 and 180, the pump contains an adjustable flow restricter and a pressure balance. The cart pump also provides hydraulic pressure to the fluid actuated rams 66 and 166 controlling movement of the toe cap mechanisms. A full schematic diagram of the control system of the transfer cart is essentially similar to the control system of the slab turner shown in FIG. 16.

The programmable logic controller also insures synchronous movement of the slab turner and the transfer cart relative to each other. During inverting, loading, and unloading of the slab on the transfer cart, the transfer cart is connected to the programmable logic controller through a connector 13, shown schematically in FIG. 16. The transfer cart is temporarily disconnected from the programmable logic controller as the cart moves toward the scarfing station and is reconnected during interdigitation with the slab turner.

Figure 4:
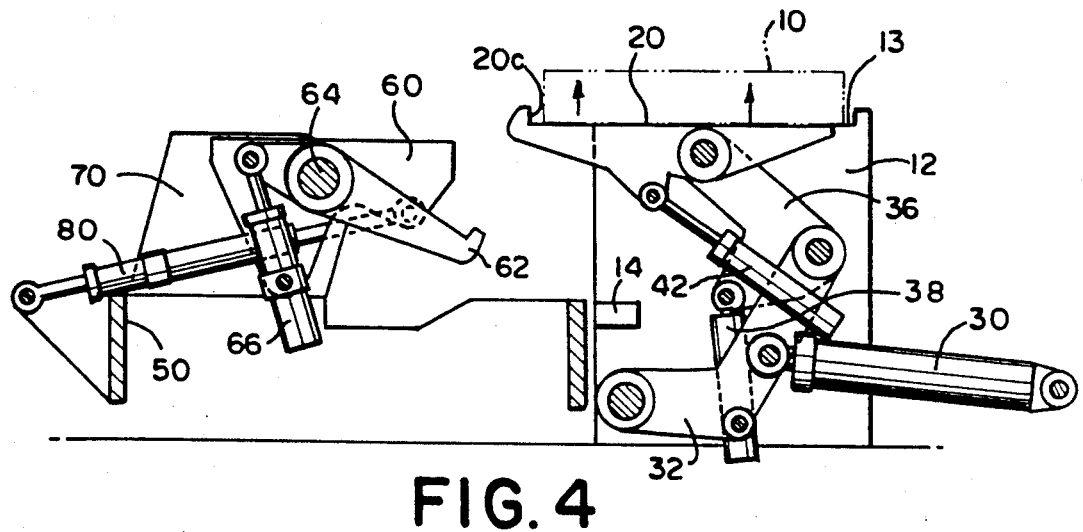
FIG. 4 is a side plan view of the slab positioning system showing the transfer cart and slab turner in their parked positions.

The synchronized steps for rotating the slab are depicted in FIGS. 4–15. As seen in FIG. 4, an overhead lifting device (not shown) first delivers a slab 10 to the bunk 13 of a rigid support structure 12 surrounding the slab turner. The rigid support structure 12 is designed to absorb the impact loading of the slab so that the overhead lifting device need not be precisely controlled to gently deliver the slab 10 on the slab turner. At this point, the slab turner is in its parked position with the turner bunk 20 located just underneath the bunk 13 of the rigid support structure. The primary 30 and secondary 38 cylinders are at their minimum strokes when the turner is in the parked position. The turner bunk is designed to receive slabs of varying widths, approximately from 32" to 78", and of varying thicknesses, approximately from 9" to 10". The overhead lifting device delivers the slab to the bunk 13 as close to the toe caps of the turner 20c as possible.

At this point in the handling cycle, the cart is also in its parked position as shown in FIG. 4. The toe cap mechanism 62 of the transfer cart is in a lowered position immediately after the previous slab has been removed from the transfer cart by the overhead lifting device at the end of the previous surface conditioning cycle. After the slab has been delivered to the bunk 13 of the rigid support structure, a sensing device 14, such as a sonic measuring device shown schematically in FIG. 16, locates the right edge of the slab as it rests on the bunk 13. This dimension is relayed to a control system, such as a programmable logic controller, to compute the transfer position of the slab on the transfer cart. The control system also controls the synchronous movement of the fluid actuated rams to create the desired path of motion of the slab turner. At the transfer position, the right edge of the slab is located as close as possible to the toe cap mechanism 62 and 162 of the cart.

Figure 5:
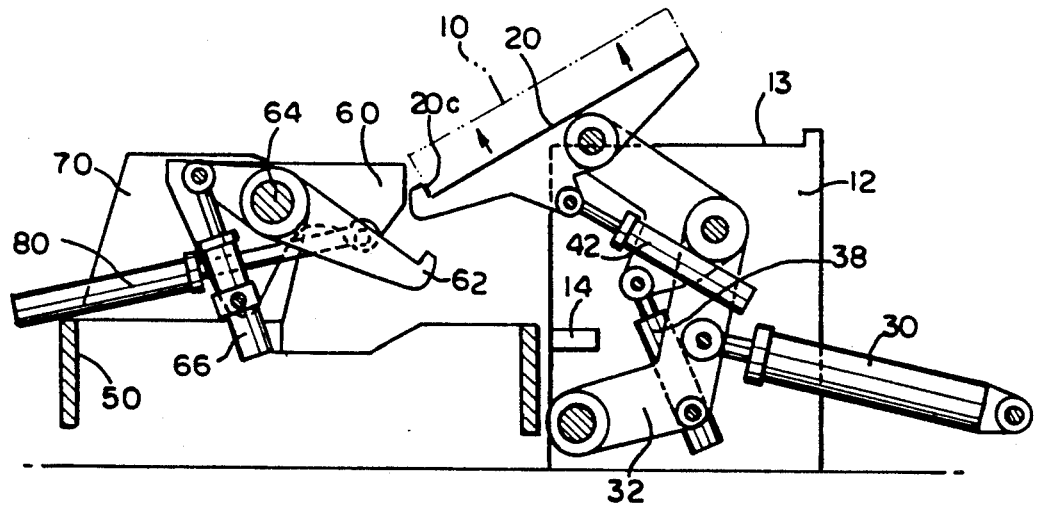
FIGS. 5-10 are side views of the slab positioning system showing the sequence of movements to position the slab on the cart with surfaces exposed for scarfing.

As seen in FIG. 5, the slab turner is next raised from beneath the bunk 13 of the rigid support structure 12, lifting and rotating the slab counterclockwise to a predetermined angular position of approximately 30 degrees so that the slab 10 slides down the bunk and rests against the toe cap 20c of the turner bunk. Since the slab had been delivered as close as possible to the toe cap mechanism, impact loading on the toe cap mechanism by the sliding slab is minimized. The turner has also moved towards the cart bunk and a pre-calculated position on the cart bunk as determined by the sensing device 14.

Figure 6:
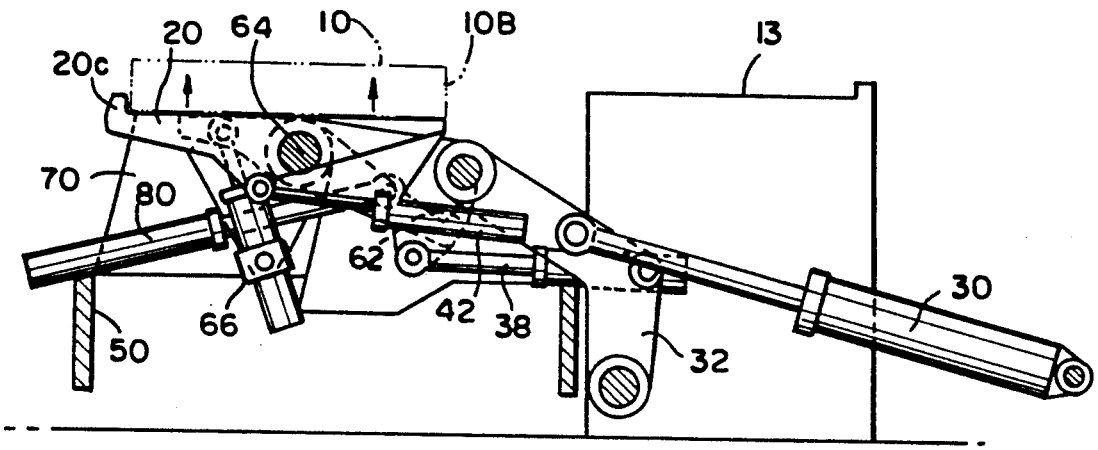

Referring to FIG. 6, the turner rotates the slab clockwise back to a horizontal position as it continues to move towards the transfer cart and places the slab on the pre-calculated position on the cart bunk. The right edge 10b of the slab 10 is always placed at the same point on the cart bunk 60 so as to not interfere with the toe cap mechanism 62 and 162 when the bunk is raised to a position parallel with the cart bunk. In this position, the cart bunk and turner bunk simultaneously support the slab. The primary 30 and secondary 38 cylinders are in their extended positions.

Figure 7:
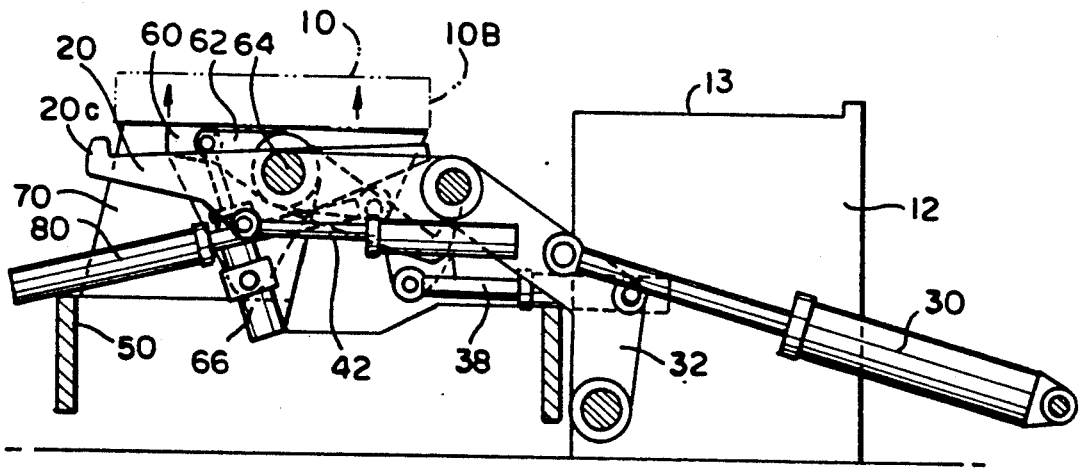

The turner bunk is next lowered below the level of the cart bunk as seen in FIG. 7, so that the toe caps 20c may pass under the slab. The slab now rests completely on the cart bunk. The turner is then withdrawn from underneath the slab. The cylinders 30, 38 and 42 are controlled to keep the turner bunk in substantially a horizontal position as it is withdrawn from underneath the transfer cart so as to avoid interfering with the slab.

Figure 8:
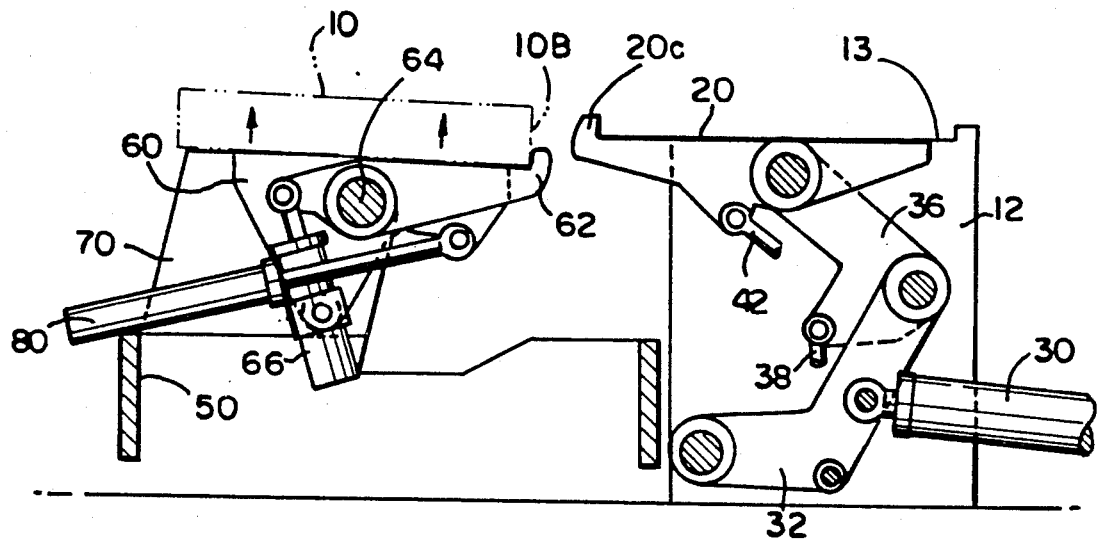

As seen in FIG. 8, the turner next maneuvers under the slab and returns to its parked position. The turner remains in its parked position for the next several steps in the surface finishing process. After the turner has returned to its parked position, the toe cap mechanism 62 on the cart is raised to the same level as the transfer cart bunk.

Figure 9:
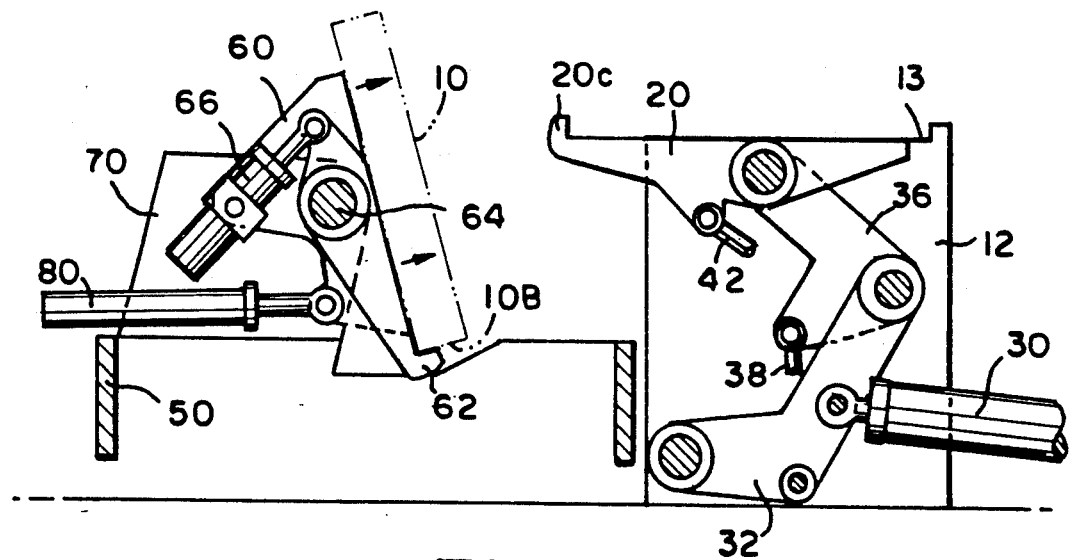

As seen in FIG. 9, after the toe cap mechanism 62 and 162 is raised, the cart bunk is rotated clockwise towards the turner to a predetermined position of 75 degrees from horizontal so that the slab may slide down the cart bunk and rest against the toe cap mechanism. This position is the 75 degree surface scarfing position. In this position, the cart leaves the turning station and is driven along the guide rails into the scarfing station where the slab's first surface is scarfed, preferably by carrying the slab past stationary scarfing equipment.

Figure 10:
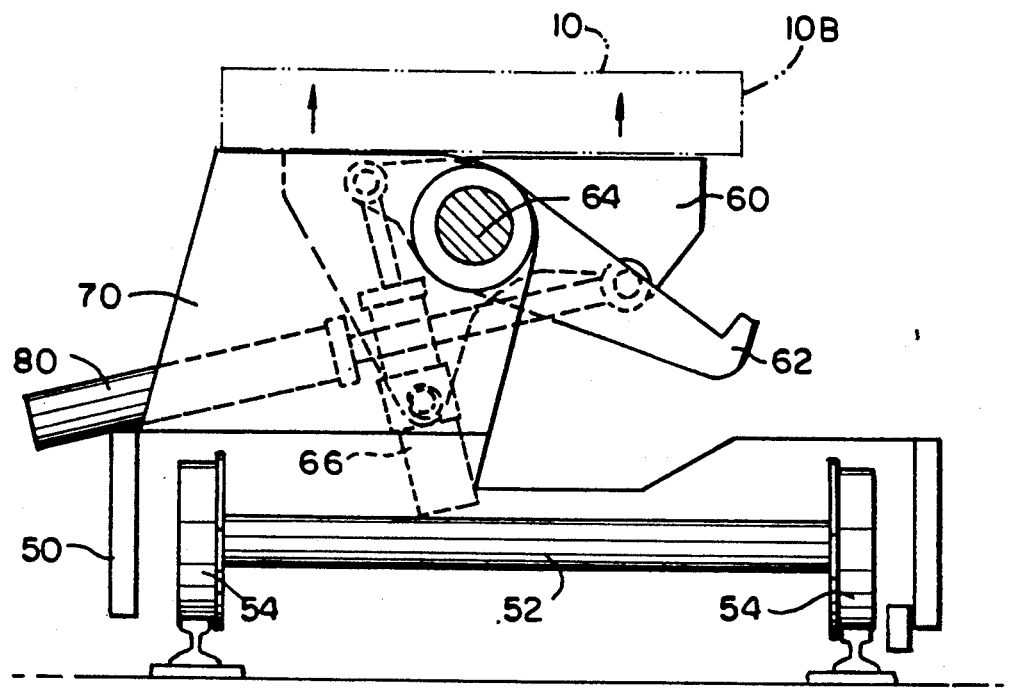

After the slab's first surface is scarfed, the slab is raised to a horizontal position with the toe cap mechanism 62 and 162 lowered to approximately 37 degrees as seen in FIG. 10. In this position, the slab's first edge can be scarfed without interference from the toe cap mechanism 62.

Figure 11:
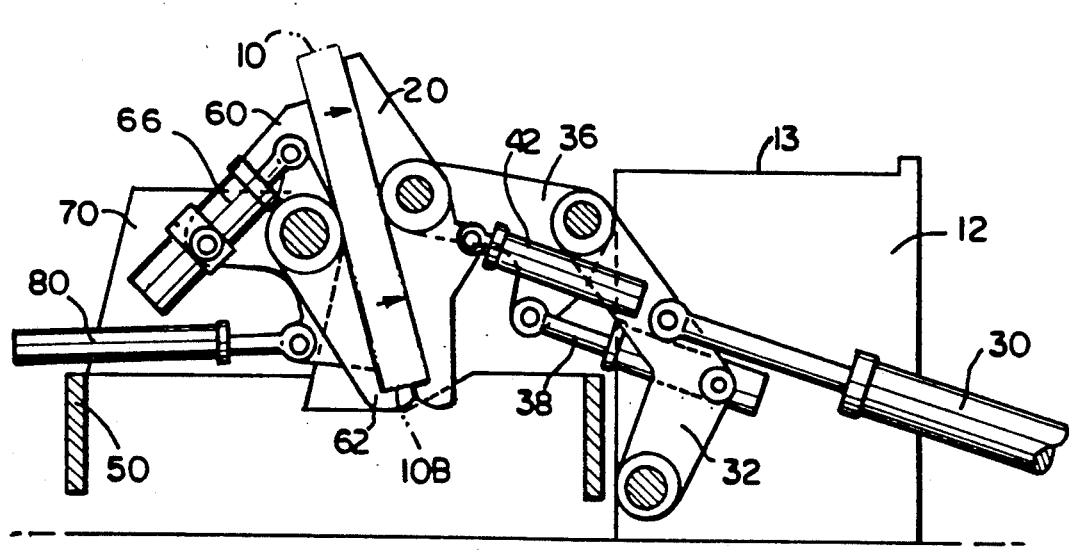
FIGS. 11-15 are views of the system showing rotation of the slab to expose opposite surfaces for scarfing.

After the first outside edge is scarfed, the slab must be turned to scarf the other flat surface and outside edge. Referring to FIG. 11, the toe cap mechanism is raised and the cart bunk is once again rotated clockwise 75 degrees from horizontal to the same surface scarfing position as shown in FIG. 9. This rotation can occur while the cart is in the scarfing station or when the cart returns to the turning station, or while in transit.

Figure 12:
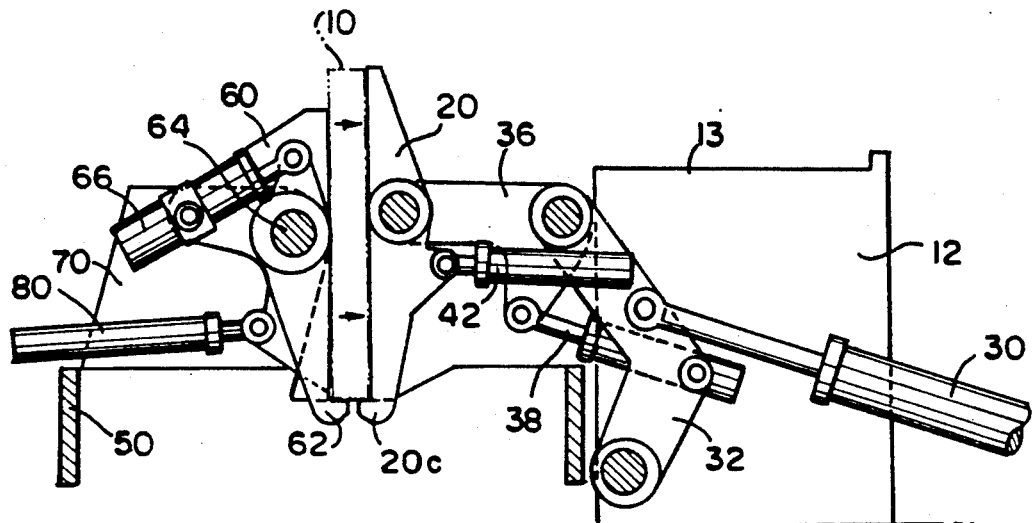
Figure 13:
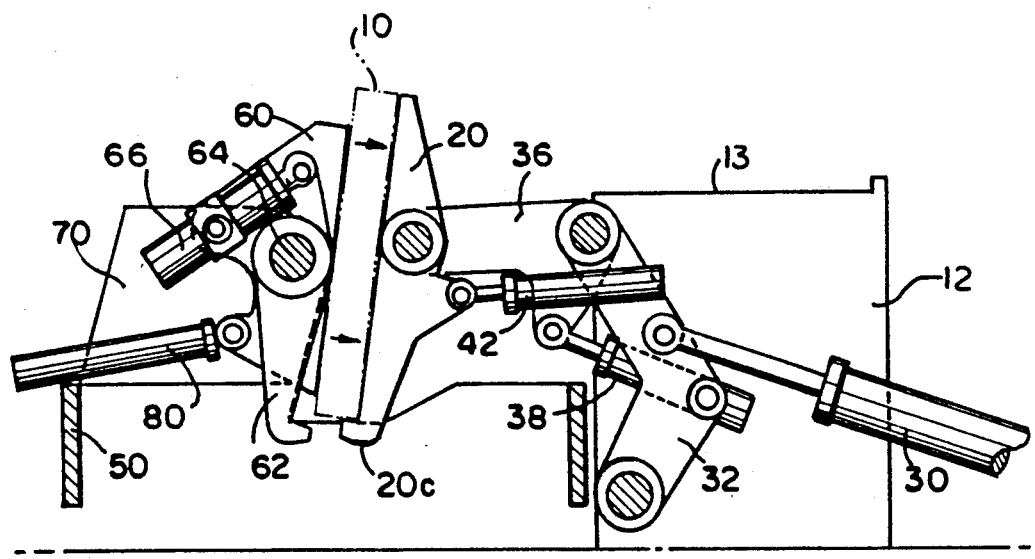
Figure 14:
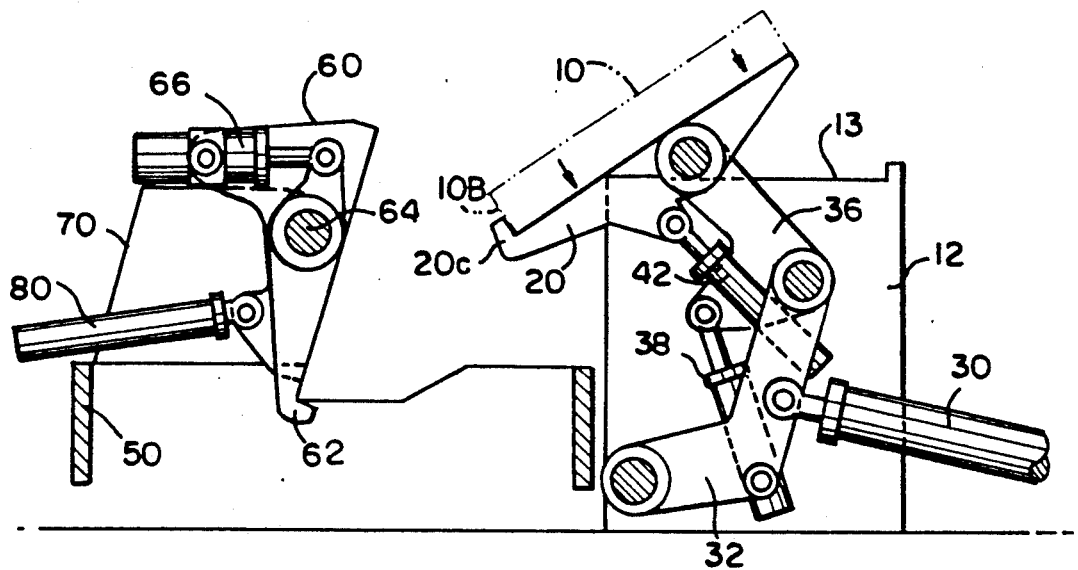

After the cart bunk is rotated and is in proper position at the turning station, the turner is once again activated, rotating and moving the turner bunk towards the tilted slab. The turner bunk eventually overlaps or interdigitates with the cart bunk while the slab is sandwiched in between the turner bunk and cart bunk and is concurrently supported by both. Both bunks are rotated clockwise as seen in FIGS. 12 and 13 until the slab rests solely on the turner bunk. Once the slab rests solely on the turner bunk, the turner bunk is withdrawn from the cart bunk as seen in FIG. 14. As the slab approaches a horizontal position on the slab turner, the slab is turned upside down as shown by the arrows on the slab.

Figure 15:
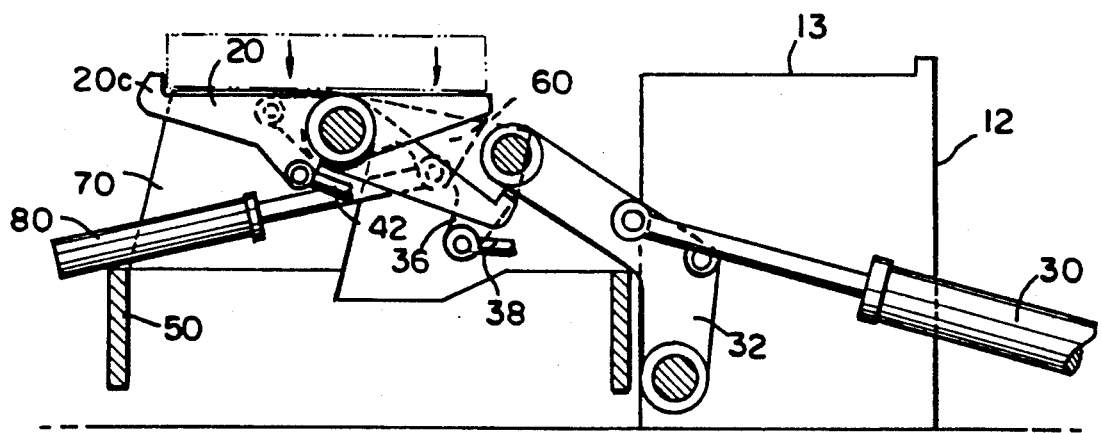

A seen in FIG. 15, the turner then repeats the motion of placing the inverted slab on the cart for scarfing and moving the cart to the scarfing station. The steps for scarfing the first outside surface and edge are then repeated to scarf the second outside surface and edge, with the turner having returned to the park position. Once the entire slab is scarfed, the cart returns to the turning station with the cart bunk positioned horizontally and with the toe cap mechanism raised as shown in FIG. 5. The slab may then be removed from the cart by the same overhead lifting mechanism which has deposited the next slab on the bunk 13 of the support 12 at the turning station.

The present invention provides several advantages over the prior art. Since the transfer cart moves relative to the stationary scarfing equipment, the slab velocity is controlled more accurately by movement of the cart, not the scarfing machine.

The present invention requires use of an overhead lifting device only twice during the scarfing cycle i.e. to load an unfinished slab and unload the scarfed slab. Since the overhead lifting device is not required to turn the slab, handlings by the overhead lifting device, and thus wear and maintenance, are reduced by one half. Reduced demand on the overhead lifting device will effect an increase in production as well. Safety is also improved since the heavy slabs are lifted positively from underneath the slab by the turner as opposed to being lifted from its top surface by a set of magnets on lifting device.

In accordance with prior conventional practices, slabs are delivered directly on to movable carts for scarfing or other purposes. Since the overhead lifting device cannot be controlled with precision while delivering the slabs, impact loading has deleterious effects on the movable carts. In the present invention, the slab is initially delivered to a sturdy, well-supported rigid structure capable of withstanding repetitive impact loading. This reduces the wear on both the slab turner and the transfer carts since the slab turner is capable of gently delivering the slab on the transfer cart without significant impact loading.

The present invention also reduces personnel involvement in the scarfing process which becomes more automated. Loading of the cars is more efficient since each slab only occupies one cart during the scarfing process.

The present system is capable of handling slabs of widths varying from 2 feet to 7 feet. The slab turner is capable of changing its path of motion to accommodate various slabs and to deliver various slabs to the optimum position on the transfer cart to minimize impact loading on the transfer cart toe cap mechanism.

The transfer cart in the present invention is also adapted to receive slabs of various widths. Additionally, the toe cap mechanism of the transfer cart is retractable which allows the outside edges of the slab to be scarfed while loaded on the cart. The retractable toe cap mechanism also allows the cart to be more easily loaded and unloaded at the slab turning station.

While particular embodiments of the present invention have been herein illustrated and described, it is not intended to limit the invention to such disclosures but changes and modifications may be made therein and thereto within the scope of the following claims.

I claim:

1. A mechanism for positioning on a carrier a slab having opposite surfaces comprising a support structure, and a bunk adapted to support the slab with one surface of the slab facing upward and being pivotally-mounted on said support structure for rotation about a bunk axis of rotation, said support structure having means for rotating said bunk and means for linearly displacing said bunk perpendicular to said bunk axis, first means to displace said bunk relative to said slab while the slab is horizontal to enable transfer of the slab while horizontal between said bunk and a carrier, and a second means to displace said bunk relative to the slab while the slab is non-horizontal to enable transfer of the slab while non-horizontal between said bunk and the carrier.

2. A system for rotating and handling a slab requiring surface conditioning having a top and bottom flat surface, and a first and second side surface, comprising:
a slab turner having a turner support structure and a turner bunk adapted to receive the slab, said turner bunk defining a turner bunk flat plane and being pivotally-mounted on said turner support structure for rotation about a turner bunk axis of rotation, said turner support structure including a turner support base, and having means for rotating said turner bunk about said bunk axis, and means for linearly displacing said turner bunk in a direction perpendicular to said turner bunk axis;
a carrier having a cart support structure and a cart bunk adapted to receive the slab at a transfer position on said cart bunk, said cart bunk defining a cart bunk flat plane and being pivotally-mounted on a cart support structure, and means for rotating said cart bunk about a cart bunk axis of rotation on said cart support structure;
said turner support structure having first means to displace said turner bunk relative to said slab while the slab is horizontal to enable transfer of the slab while horizontal between said turner bunk and said carrier and,
second means to displace said turner bunk relative to the slab while the slab is non-horizontal to enable transfer of the slab while non-horizontal between said turner bunk and said carrier.

3. A system according to claim 2 for rotating and handling a slab selected from a group having varying dimensions, including a sensing device for locating the surface boundaries of the slab when the slab is received on said turner bunk.

4. A system for rotating and handling a slab according to claim 2 wherein said turner support structure comprises a first support member pivotally-mounted on said support base for rotation about a first axis of rotation, and at least one second-support member pivotally-mounted on said first support member for rotating said turner bunk about a second axis of rotation relative to said first support member whereby said turner bunk may be linearly displaced by selectively rotating said first and second support members.

5. A system for rotating and handling a slab according to claim 4 wherein said first, second and turner bunk axes of rotation are independent and parallel.

6. A system for rotating and handling a slab according to claim 2 wherein said means for rotating said turner bunk comprises at least one fluid-actuated ram coupled between said turner bunk and said turner support structure and operable between extended and retracted positions for rotating said turner bunk about said turner bunk axis of rotation.

7. A system for rotating and handling a slab according to claim 2 wherein said means for linearly displacing said turner bunk comprises at least one fluid-actuated ram coupled between said turner support structure and said turner support base, and at least one fluid-actuated ram coupled between said turner support structure and said second-support member, said fluid-actuated rams being operable between extended and retracted limit positions.

8. A system for rotating and handling a slab according to claim 2 wherein said turner bunk comprises at least one toe cap fixed to one edge of said turner bunk perpendicular to said turner bunk flat plane for supporting and preventing movement of said slab in said plane when said one turner bunk edge is rotated downwardly to rotate the turner bunk plane from a horizontal position to a vertical position.

9. A system for rotating and handling a slab according to claim 2 wherein said cart bunk comprises at least one toe cap mechanism, pivotally-mounted on said cart support structure and defining a toe, and a toe cap rotating means, for rotating said toe cap mechanism about a toe cap axis of rotation relative to said cart bunk between extended and retracted positions.

10. A system for rotating and handling a slab according to claim 9 wherein said toe cap rotating means has a first and second limit positions, wherein said toe intercepts said cart bunk plane to engage the edge of the slab in said extended position, and said toe is rotated about said toe cap axis of rotation out of said cart bunk plane and away from the edge of the slab in said retracted position.

11. A system for rotating and handling a slab according to claim 2 comprising a rigid support structure interdigitated with said turner bunk for receiving said slab.

12. A system for rotating and handling a slab according to claim 2 wherein said turner bunk rotating means rotates through at least 90 degrees of rotation from its horizontal position towards said cart bunk to enable inverting of the slab from said cart bunk onto said turner bunk.

13. A system for rotating and handling a slab according to claim 2 wherein said cart bunk and said turner bunk are interdigitated and concurrently support said slab when transferring said slab from one bunk to the other.

14. A system for rotating and handling a slab according to claim 13 wherein said cart bunk and turner bunk are interdigitated and are constructed and arranged to be disposed co-planar and horizontally to concurrently support said slab, and to transfer said slab from one bunk to the other when said slab is in a horizontal position resting on one of said flat surfaces.

15. A system for rotating and handling a slab according to claim 13 wherein said cart bunk and turner bunk planes are constructed and arranged to be spaced from one another in upright positions and having interdigitated toe caps to concurrently support the slab therebetween to enable transfer of the slab from one bunk to the other when the slab is in a vertical position with one of said edge surface resting on said toe caps, said caps being constructed and arranged to underlie and support said one edge surface.

16. A system for rotating and handling a slab according to claim 3 comprising a control system having means responsive to said sensing means for calculating a desired transfer position on said cart and for controlling the movement of said turner bunk and cart bunk to deliver the slab to the transfer position.

* * * * *